United States Patent [19]
Rust

[11] Patent Number: 5,745,603
[45] Date of Patent: Apr. 28, 1998

[54] TWO DIMENSIONAL CONTEXT MODEL OBTAINED WITHOUT A LINE BUFFER FOR ARITHMETIC CODING

[75] Inventor: Robert A. Rust, Boise, Id.

[73] Assignee: Hewlett-Packard Company, Palo Alto, Calif.

[21] Appl. No.: 703,613

[22] Filed: Aug. 26, 1996

[51] Int. Cl.$^6$ .................................................... G06K 9/00
[52] U.S. Cl. ............................................ 382/229; 382/247
[58] Field of Search ................................. 382/232, 233, 382/234, 235, 236, 239, 241, 242, 243, 244, 247, 248, 251, 229, 230, 231, 238, 240, 245, 246, 250, 252, 253, 190, 282, 283, 284, 276, 277, 278, 279, 293, 295, 302, 307, 308; 358/426, 261.3, 262.1, 432; 348/580, 121, 552, 397, 390; 341/107, 51; 370/395, 389

[56] References Cited

U.S. PATENT DOCUMENTS

| | | | |
|---|---|---|---|
| 4,463,380 | 7/1984 | Hooks, Jr. | 358/160 |
| 4,785,349 | 11/1988 | Keith et al. | 358/136 |
| 5,299,197 | 3/1994 | Schlafly | 370/94.1 |
| 5,381,145 | 1/1995 | Allen et al. | 341/107 |
| 5,442,458 | 8/1995 | Rabbani et al. | 358/426 |

Primary Examiner—Leo Boudreau
Assistant Examiner—Bijan Tadayon
Attorney, Agent, or Firm—Anthony J Baca

[57] ABSTRACT

An encoding method that allows the use of previous line data without requiring multiple accesses to the image or the use of a line buffer. The image, which is to be compressed, is divided into columns. Each column is traversed vertically. Each row within a column is compressed by horizontally moving across the row. After a row is compressed the next row in transferred to the compressor. Once a column is compressed, the compressor continues at the top of the next column. This process continues until all the columns have been compressed. By vertically traversing through the image, information about the previous row is limited by the width of the column. This limited storage of the previous row allows use of a two dimensional context model, which greatly increases the compression ratio.

8 Claims, 4 Drawing Sheets

100  101  102  103  104  105

FROM DRAM

TWO DIMENSIONAL CONTEXT MODEL OBTAINED WITHOUT A LINE BUFFER FOR ARITHMETIC CODING

TECHNICAL FIELD

The present invention relates to a method and device for arithmetically encoding an image without the need to buffer an entire row of image data.

BACKGROUND OF THE INVENTION

Data compression systems are known in the prior art that encode a stream of digital data signals into compressed digital code signals and decode the compressed digital code signals back into the original data. Data compression refers to any process that attempts to convert data in a given format into an alternative format requiring less space than the original. The objective of data compression systems is to effect a savings in the amount of storage required to hold or the amount of time required to transmit a given body of digital information.

To be of practical utility, a general purpose digital data compression system should satisfy certain criteria. The system should have reciprocity. In order for a data compression system to possess the property of reciprocity it must be possible to re-expand or decode the compressed data back into its original form without any alteration or loss of information. The decoded and original data must be identical and indistinguishable with respect to each other. The property of reciprocity is synonymous to that of strict noiselessness used in information theory. Some applications do not require strict adherence to the property of reciprocity. One such application in particular is when dealing with graphical data. Because the human eye is not that sensitive to noise, some alteration or loss of information during the compression de-compression process is acceptable.

The system should provide sufficient performance with respect to the data rates provided by and accepted by the devices with which the data compression and de-compression systems are communicating. The rate at which data can be compressed is determined by the input data processing rate into the compression system, typically in millions of bytes per second (megabytes/sec). Sufficient performance is necessary to maintain the data rates achieved in present day disk, tape and communication systems which rates typically exceed one megabyte/sec. Thus, the data compression and de-compression system must have enough data bandwidth so as to not adversely affect the overall system. The performance of data compression and de-compression systems is typically limited by the computations necessary to compress and de-compress and the speed of the system components such as, random access memory (RAM), and the like, utilized to store statistical data and guide the compression and de-compression process. Performance for a compression device is characterized by the number of processor cycles required per input character under the compressor. The fewer the number of cycles, the higher the performance.

Another important criteria in the design of data compression and decompression systems is compression effectiveness, which is characterized by the compression ratio. The compression ratio is the ratio of data size in uncompressed form divided by the size in compressed form. In order for data to be compressible, the data must contain redundancy. Compression effectiveness is determined by how effectively the compression procedure uses the redundancy in the input data. In typical computer stored data, redundancy occurs both in the nonuniform usage of individual symbology, example digits, bytes, or characters, and in frequent recurrence of symbol sequences, such as common words, blank record fields and the like.

General purpose data compression procedures are also known in the prior art, three relevant procedures being the Huffman method, the Tunstall method and the Lempel-Ziv method. The Huffman method is widely known and used, reference thereto in article of D. A. Huffman entitled "A Method For Construction Of Minimum Redundancy Codes", Proceedings IRE, 40, 10 pages 1098-1100 (September 1952). Reference to the Tunstall algorithm may be found in Doctoral thesis of B. P. Tunstall entitled "Synthesis of Noiseless Compression Codes", Georgia Institute of Technology (September 1967). Reference may be had to the Lempel-Ziv procedure in a paper authored by J. Ziv and A. Lempel entitled "A Universal Algorithm For Sequential Data Compression", IEEE Transactions on Information Theory, IT-23, 3, pages 337-343 (May, 1977).

One of the first general purpose data compression procedures developed is the Huffman method. Briefly described, the Huffman procedure maps full length segments of symbols into variable length words. The Huffman data compression procedure suffers from two limitations. Firstly, the Huffman procedure operates under the constraint that the input data to be compressed be parsed into fixed length segments of symbols. Although the Huffman procedure provides the best compression ratio that can be obtained under these constraints, when the constraint is relaxed it is possible to obtain significantly better compression ratios by utilizing other procedures. Secondly, Huffman coding requires full knowledge of the statistical characteristic of the source data. The Huffman procedure operates under the assumption that the probability with which each fixed length input segment occurs is known. This requirement of the Huffman procedure can in practice, be satisfied by the use of an adaptive version of the procedure which accumulates the necessary statistics during processing of the data. This, however, is cumbersome, and requires considerable working memory space and performs sub-optimally during adaptation.

The Tunstall algorithm, which maps variable length segments of symbols into fixed length binary words, is complimentary to the Huffman procedure with the fixed length constraints now applied to the output segments instead of the input segments. Like the Huffman procedure, the Tunstall procedure requires a foreknowledge of the source data probabilities. Again this foreknowledge requirement can be satisfied to some degree by utilizing an adaptive version which accumulates the statistics during processing of the data.

The Lempel-Ziv procedure maps variable length segments of the symbols into variable length binary words. It is asymptotically optimal when there are no constraints on the input or output segments. In this procedure the input data string is parsed into adaptively grown segments, each segment consisting of an exact copy of an earlier portion of the input string suffixed by one new symbol from the input data. The copy which is to be made is the longest possible and is not constrained to coincide with any earlier parsed segment. The code word which replaces the segment in the output contains information consisting of a pointer to where the earlier copied portion begins, the length of the copy, and the new symbol.

It would appear that Huffman or Shannon-Fano coding is the perfect means of compressing data. However, this is not the case. As mentioned above, these coding methods are optimal when and only when the symbol probabilities are integral powers of ½, which is usually not the case.

The technique of arithmetic coding does not have this restriction: It achieves the same effect as treating the message as one single unit (a technique which would, for Huffman coding, require enumeration of every single possible message), and thus attains the theoretical entropy bound to compression efficiency for any source.

In arithmetic coding, one decision after another is encoded to define successfully smaller, lesser included intervals along a number line. Additional information on arithmetic coding can be found in "An Introduction To Arithmetic Encoding"; by G. G. Langdon, Jr., IBM Journal of Research and Development, Vol. 28, n. 2, March 1984, 135–149; and "Arithmetic Compression Code Control Parameters Approximation"; by D. R. Helman, G. G. Langdon, Jr., and J. J. Rissanen, Vol. 23, n. 11, April 1981, 5112–5114 and U.S. Pat. No. 4,905,297, "Arithmetic Coding Encoder And Decoder System", Langdon, Jr. et al. all incorporated herein by reference.

As noted in the above articles, arithmetic coding provides that each decision has a plurality of possible exclusive outcomes "or events". Each outcome or event is represented in data by a symbol. In the imaging environment, for example, each decision may correspond to whether or not a given pixel is black. The decision outcome being represented by a Y (or YES) symbol if the pixel is black or an N (or NO) symbol if the pixel is not black. Thus, a plurality of decisions may then be represented by a sequence of symbols, e.g., YNNY...

In accordance with prior arithmetic coding teachings, a probability line has a current interval defined thereon. The first current interval is 0 to 1. The current interval is divided into segments in which segment corresponds to one possible outcome for the next decision. Where there are only two possible outcomes for each decision, the current interval is divided into two segments. The length of each segment is based on its respective associated probability. The respective probabilities may remain fixed or may adapt as decision data is entered.

It is the correlating of large segments to symbols which occur with greater frequency that leads to the compression effect. In the former cited article ("An introduction To Arithmetic Encoding"), a 4-symbol arithmetic coding example is set forth in which each decision can result in an "a" event (having a 50% probability), a "b" event (having a 25% probability), a "c" event (having a 12.5% probability), or a "d" event (having a 12.5% probability). Representing the four events in binary form would require two bits for each decision, where the events would be represented respectively by 00, 01, 10, 11. For three decisions such as "aab" which is highly likely, the straight forward encoding data would be 00 00 01; requiring six bits. However, as observed in the article at page 137, the arithmetic coding approach permits the sequence "aab" to be represented by the value 0.001. Instead of six bits, the information can be represented in three bits. This conservation of bits results as successive events having relatively high associated probabilities occur.

The conservation deteriorates if numerous events occur for which there are low probabilities and relatively short line segments. With the above noted probabilities, a sequence of events "dd" would be represented with encoded data as 11 11 whereas, by arithmetic coding, the "dd" events would be represented by 111111. Provided that the larger segments in fact correspond to events that occur with correspondingly greater frequency, the additional bits needed for less probable symbols are outweighed by the conservation achieved when more probable symbols occur.

Experiments have shown that the previous line data helps tremendously when compressing text and line art data. For example, a line art of the space shuttle, which contains much white space and straight lines, compresses at 18:1 for a single line context model. The same image compresses at 43:1 when the previous line data is used.

All two dimensional context models require previous line data. This need for previous line data is generally solved by maintaining a line buffer to store the previous row of data. Such a solution can be expensive for high resolutions. For example, for an 11 inch wide image at 1200 DPI, a single line buffer requires about 1.6 KB or memory. If a 3×3 context model is used, a two line buffer is needed thereby doubling the memory requirement.

Prior to the present invention, the compression engine read the data a line at a time. Before the data is compressed, the previous line is read from the line buffer. Finally, the compressed data is store back in memory. Some application access the rows simultaneously. However, simultaneous access requires double or maybe even triple bandwidth to allow retrieval of the precious line data.

SUMMARY OF THE INVENTION

In order to accomplish the present invention there is provided a method for encoding image data. First a context model is defined. Next, the image data is logically divided into a plurality of columns. Past, current and next rows for the present column are buffered in a compressor. The context model defines bits that are used by the compressor to compress a given bit. These bits, and the bit to be compressed, are transferred to the compressor. The context model is shifted horizontally by a single bit position until each bit in the current row of the present column has been compressed. Next, the context model moves vertically in the present column thereby feeding the next row to the compressor. The vertically movement is most efficiently accomplished by renaming, in the buffer, the current row to the past row and the next row to the current row. After the renaming, the new next row must be retrieved from memory and stored in the buffer.

BRIEF DESCRIPTION OF THE DRAWING

A better understanding of the invention may be had from the consideration of the following detailed description taken in conjunction with the accompanying drawings in which.

DETAILED DESCRIPTION OF THE PREFERRED EMBODIMENTS

Figure 1:
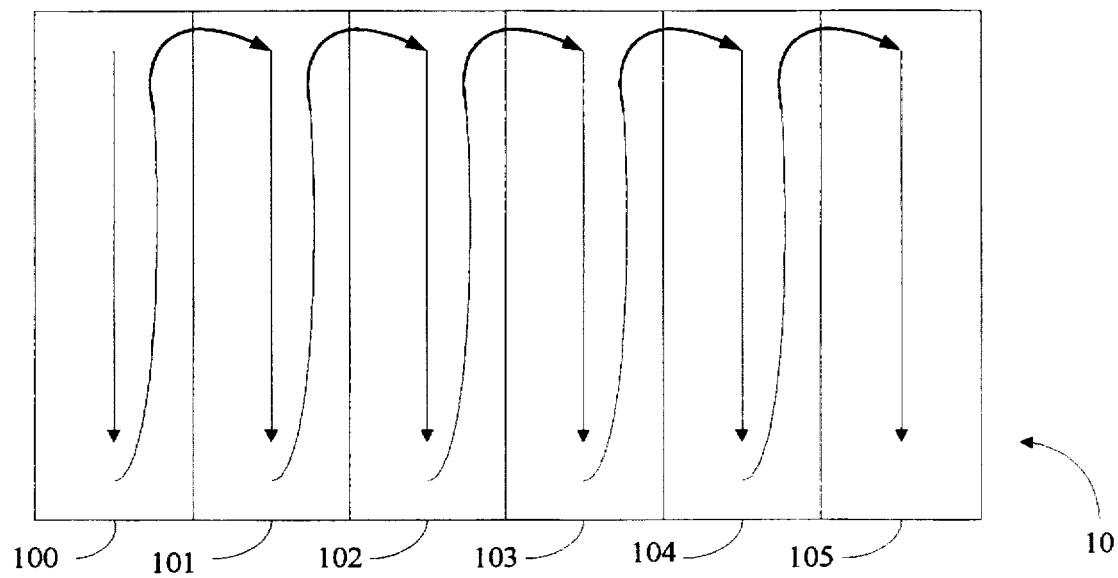
FIG. 1 illustrates the vertical progression through an image.

The present invention allows the use of previous line data without requiring multiple accesses to the image or the use of a line buffer. Referring now to FIG. 1, the present invention moves vertically through the image storing only a small amount of the previous line data.

In FIG. 1, image 10, which is to be compressed, is divided into six columns 100–105. Instead of traversing image 10 horizontally, it is traversed vertically as illustrated by the arrows. Thus, the compressor starts at the top left corner and proceeds down column 100. Once the column 100 is compressed, the compressor continues at the top of column 101. This process continues until column 105 has been compressed. By vertically traversing through the image, information about the previous row is limited by the width of the column. This limited storage of the previous row allows use of a two dimensional context model, which greatly increases the compression ratio. Additionally, the limited previous row data is considerably smaller that saving the entire previous row.

Figure 2:
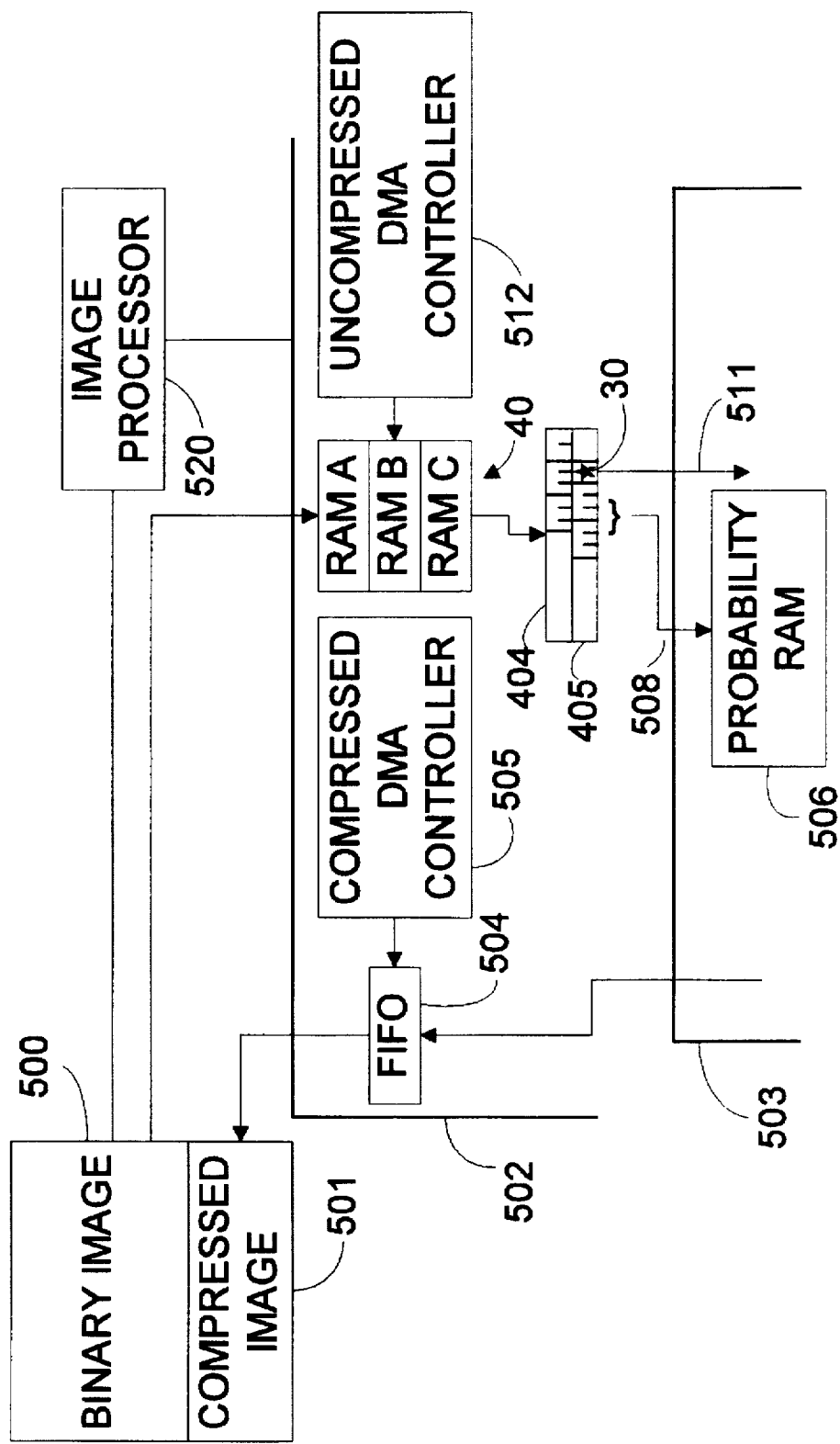
FIG. 2 is a high level block diagram in accordance with the present invention.

With that brief, high level description about the present invention, a more detailed look at the preferred embodiment follows. Referring now to FIG. 2, the data flow for the compression process is shown in a simplified block diagram. Hardware compressor 502 requests image data from DRAM 500 under control of DMA controller 512. Data retrieved from memory 500 is stored in the appropriate compartment of memory buffer 40 in accordance with the description given below.

The current row is transferred from memory buffer 40 into shift register 405 and the previous row is transferred to shift register 404. Bit 30 is currently being compressed in FIG. 2. Related bits 508 form an address for probability ram 506 of the arithmetic coding hardware 503. Based upon the output of probability ram 506 and additional arithmetic operations performed by arithmetic coding hardware 503, an MPS (most probable symbol) for bit 30 is generated. After a particular bit 30 has been compressed, data in shift registers 404 and 405 is shifted allowing for a new bit to be compressed.

Arithmetic coding hardware 503 passes compressed data to FIFO 504 as it is created. Under the control of DMA controller 505, data is transferred from FIFO 504 into DRAM 501. After all the data in DRAM 500 has been compressed and transferred to DRAM 501, hardware compressor 502 notifies the image processor 520 that the compression is complete.

With the aid of FIG. 2 the data flow for the decompression can be described. Compressed data is transferred from DRAM 501 into FIFO 504 under the control of DMA controller 505. Arithmetic coding hardware 503 decompresses the data and outputs a single bit 511 at a time.

Bit 30 is predicted based upon its relationship with bits 508. Bits 508 form an address for probability ram 506. Based upon the output of probability ram 506 and additional arithmetic operations performed by arithmetic coding hardware 503, the state of bit 30 is generated. Next, shift registers 404 and 405 are shifted allowing for the next bit to be decompressed. Eventually, shift register 405 contains an entire byte of uncompressed data. First the data in shift register 404 is transferred into memory buffer 40. Next, the contents of shift register 405 is transfer into memory buffer 40 and also into shift register 404. Under the control of DMA controller 512, the uncompressed data is transferred from memory 40 into DRAM 500.

Figure 3:
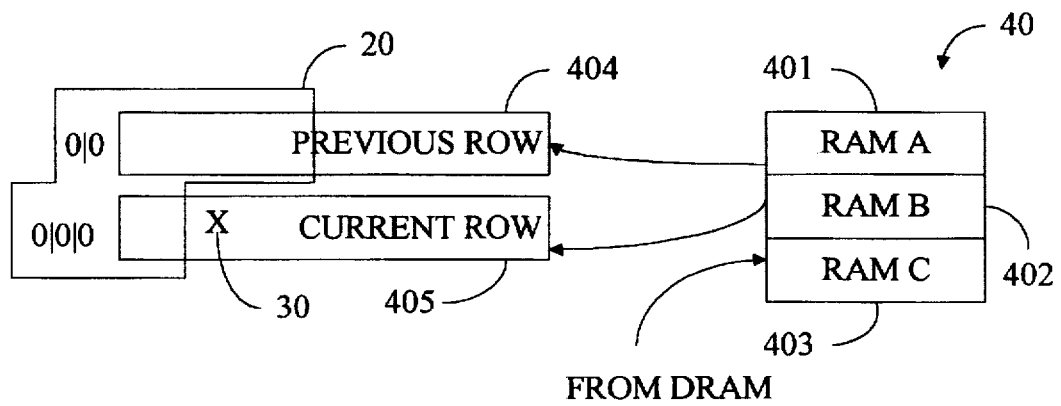
FIG. 3 shows the interaction between the memory buffer and shift registers.

Referring now to FIG. 3, memory 40 is divided into three portions 401–403, which form a circular buffer. The width of memory 40 is equal to the width of a vertical column such as 100. As FIG. 3 currently shows, RAM A 401 contains data for the previous row, RAM B 402 contains data for the current row and RAM C 403 is loaded with data for the next row from DRAM. Within the arithmetic compressor data for the current row, here RAM B 402, is transferred into register 405. Data for the previous row, here RAM A 401, is transferred into register 404. The compressor works on compressing the information in registers 404 and 405 while new information can be transferred from the main memory into RAM C 403.

Figure 4:
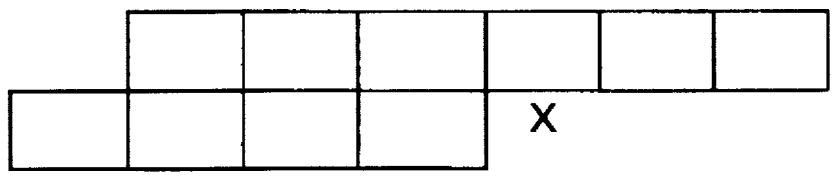
FIG. 4 shows the context model used in the preferred embodiment.

As described above, arithmetic compression uses a context model to predict the state of a given bit. FIG. 4 shows in detail the context model used in the preferred embodiment. This particular context model uses information from the current row as well as from the row above the bit being compressed. Additionally, note that in the row above, the context model uses bits to the right of the current bit and in the current row, bits to the left of the current bit.

Figure 5:
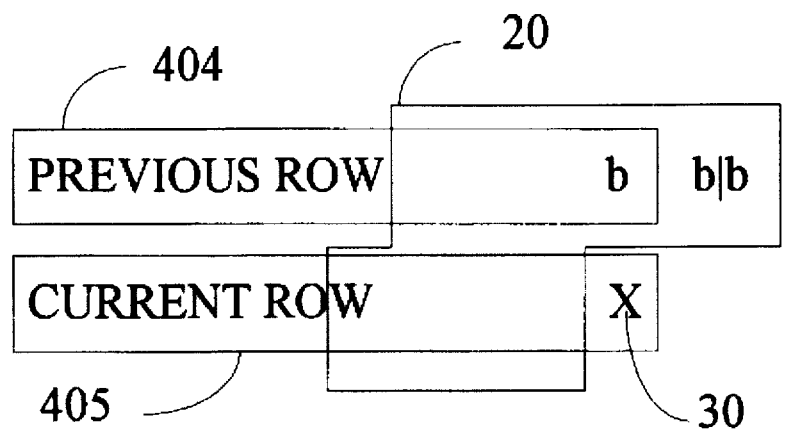
FIG. 5 illustrates bit stuffing at the end of a row.

Context model 20 moves horizontally across current row 405 as each bit 30 is compressed. During compression of the first bits of a row context window 20 attempts to utilize bits which are not present. Several options are available to the designer. The context model could be modified to not require these bits. However, such a context model may severely impact the compression ratio for some kinds of data. Alternatively, the first bit could be copied into the missing positions. Weighing the effect on the compression ratio against complexity of implementation, the preferred embodiment sets these bit to zero (0|0). Zero was selected based on the understanding that white space (i.e., zeros) is more prevalent. Therefore, it is more likely that these bits were zero. Setting these bits to zero does adversely effect the compression ratio. However, experimentation has shown that the decrease is about 2%. In a similar manor, as shown in FIG. 5, when context window 20 reaches the end the context model attempts to use information that is not available. The same options as described above are available to the designer. Here, the preferred embodiment copies of the last bit or the respective register into the missing bits.

After the current row is compressed, the pointers to memory 40 are adjusted such that RAM B 402 now contains data for the previous row, RAM C 403 contains data for the current row and RAM A is loaded with data for the next row. Again, for the current row, now RAM C 403, is transferred into register 405. Data for the previous row, now RAM B 402, is transferred into register 404. The compressor works on compressing the information in registers 404 and 405 while new information can be transferred from the main memory into RAM A 401.

The use of memory buffer 403 is not necessary for the present invention. However, a three stage buffer allows for a constant flow of data to the compressor thereby improving through-put for the system.

Increasing the width of a column reduces the impact of the starting and ending bit manipulation to the compression ratio. In the preferred embodiment, each column is 16 words wide, where each word is 32 bit wide.

Compression ratio may also be impacted by the discontinuity when the top row of a new column is compressed. For example, when the top row of column 103 is being compressed, register 405 contains data from the top row in column 103, while register 404 contains data from the bottom row of column 102. In the preferred embodiment, this discontinuity in data was found to only minimally effect the compression ratio. However, for a given application, the impact to the compression ratio may be reduced by setting the previous row to some value such as all zeros or a copy of the current row.

Figure 6:
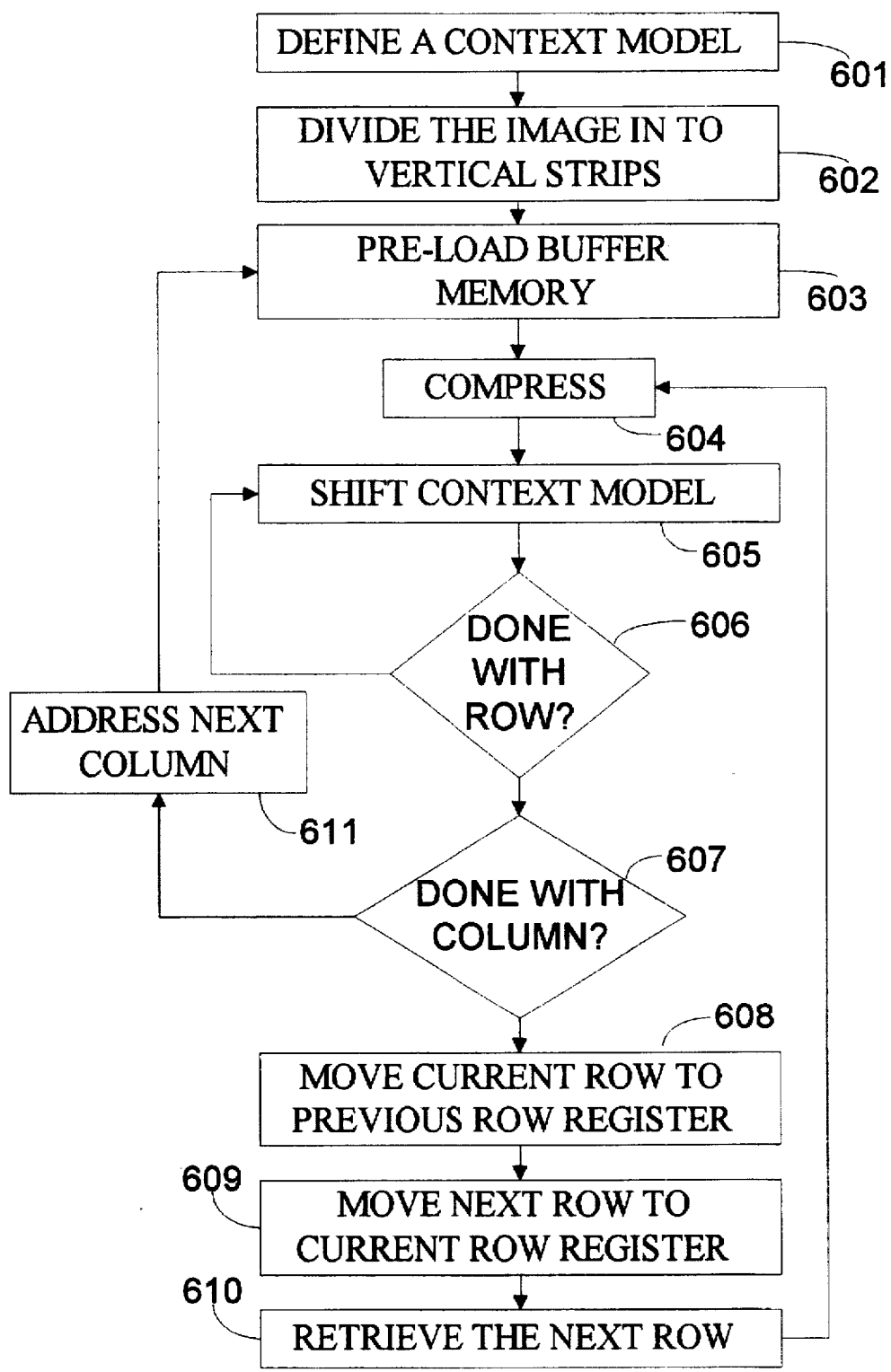
FIG. 6 is a flow diagram showing the preferred embodiment of the present invention.

The flow chart of FIG. 6 shows the logical flow for the preferred embodiment. First, a context model must be defined 601. While this may be dynamically calculated in real time, in the preferred embodiment it is determined during development of the hardware compressor 503. Next, the image is divided into columns 602. Before the compressor can start, the buffer memory 40 must be pre-loaded 603. With the buffer memory loaded, the compressor 503 is started 603. The context model horizontally shifts 605 across the current row as the compressor compresses each bit. Once the current row is compressed 606, the compressor checks if the column is done 607. If the column is done, the next column is addressed 611. If the column is not done, the registers are reloaded 608 and 609, the next row is retrieved 610 and compression continues.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for encoding image data, said method comprising the steps of:

defining a context model, said context model using a plurality of bits of a previous row of said image data and a plurality of bits of a present row of said data;

retrieving a portion of said image data;

using said context model to compress said portion; and moving said context model to a next row in said image data.

2. The method of claim 1 further comprising the step of:

dividing said image data into a plurality of columns, each column having a width.

3. The method of claim 2 wherein said step of retrieving further comprising the steps of:

first buffering said previous row from a present column, said previous row being said width wide;

second buffering said current row from said present column, said current row being said width wide; and third buffering said next row from said present column, said next row being said width wide.

4. The method of claim 2 wherein said step of using further comprising the steps of:

with the aid of said context model defining a plurality of bits of said portion;

transferring said plurality of bits and a bit to be compressed to a compressor;

said compressor generating a result;

shifting said context model horizontally by a single bit position bit; and repeating said steps of defining a plurality of bits, transferring and shifting until each bit in a single row of a single column of said plurality of columns has been compressed.

5. A method for decoding compressed image data, said method comprising the steps of:

defining a context model, said context model using a plurality of bits of a previous row of said image data and a plurality of bits of a present row of said data;

reading a portion of said compressed image data;

with the aid of said context model decompressing said portion generating a bit of said original image data;

transferring said bit into a position as defined by said context model;

shifting said context model horizontally by a single bit position;

repeating said steps of decompressing, transferring and shifting until each bit in one of plurality of columns of said original data has been transferred, each column having a width; and moving said context model to a next row in said one of said plurality of columns.

6. The method of claim 5 wherein said step of transferring further comprising the steps of:

first buffering said previous row, said previous row being said width wide; and second buffering said current row, said current row being said width wide.

7. An apparatus for reducing memory requirement for storing an image, said apparatus comprising:

a memory; and an compressor means for retrieving a previous row of said image from said memory and a present row of said image from said memory, said compressor means compressing a first portion of said present row in accordance with a context model, said compressor means generating compressed information and storing said compressed information in said memory, said compressor retrieving a next row of said image from said memory.

8. The apparatus of claim 7 further comprising:

an image processor means connected to said compressor means and said memory, said image processor means for instructing said compressor means where said image is stored in said memory, additionally said image processor instructing said compressor means where in said memory to store said compressed information.

* * * * *